United States Patent
Chang

(10) Patent No.: US 7,515,366 B2
(45) Date of Patent: Apr. 7, 2009

(54) LENS MODULE AND IMAGE CAPTURE APPARATUS

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 35 days.

(21) Appl. No.: 11/618,971

(22) Filed: Jan. 2, 2007

(65) Prior Publication Data
US 2008/0080072 A1    Apr. 3, 2008

(30) Foreign Application Priority Data
Sep. 29, 2006    (CN) .................... 2006 1 0200961

(51) Int. Cl.
*G02B 7/02* (2006.01)
(52) U.S. Cl. .................... 359/824; 359/701
(58) Field of Classification Search ........ 359/676, 359/683, 699, 701, 703, 704, 811, 819, 822, 359/823, 824, 830; 396/529
See application file for complete search history.

(56) References Cited
U.S. PATENT DOCUMENTS
6,967,785 B2    11/2005    Makii et al.
2006/0061891 A1 *    3/2006    Ito et al. .................... 359/824

* cited by examiner

*Primary Examiner*—Joseph Martinez
(74) *Attorney, Agent, or Firm*—Andrew C. Cheng

(57) ABSTRACT

An exemplary lens module includes: at least one lens; a lens barrel for receiving the lens therein, the lens barrel having at least three protrusions provided thereon; a motor having a stator and a rotator, the stator surrounding the rotator therein and being defined with coils thereon; a barrel holder having an inner space for receiving the lens barrel therein and an annular socket for receiving the rotator therein; a ring-shaped cam member attached to the rotator, the cam member having at least three sloping portions each having a lower end and a higher end sloping toward the lower end, the at least three sloping portions being arranged to be adjacent to one another in an end to end fashion; and at least one elastic member for applying a force on the lens barrel toward the cam member. Wherein the protrusions abut against and on their respective sloping portions.

20 Claims, 6 Drawing Sheets

LENS MODULE AND IMAGE CAPTURE APPARATUS

TECHNICAL FIELD

The present invention relates generally to lens modules, and more particularly, to a lens module in which the lenses are driven to move without necessarily rotating, and as well as an image capture apparatus using the lens module.

BACKGROUND

With the ongoing development of microcircuitry and multimedia technology, image capture apparatuses, such as digital still cameras, digital video cameras or the like are now in widespread use or being combined with various electronic devices. Such image capture apparatuses are needed to satisfy requirements such as reduction of the whole apparatus size, auto focus and as well as improvement of image quality.

In an image capture apparatus of the related art, the image capture apparatus typically includes at least one lens module having a plurality of lens and an image sensor for detecting light from the at least one lens module. The plurality of lens are required to co-axially align with one other and as well as the image sensor along an axial direction called "optical axial direction". The lens may be received in a lens barrel, the image sensor may be received in an image sensor housing, and the lens barrel may be threadedly engaged with the image sensor housing. When the lens barrel is rotated relative to the image sensor housing, the lens may thus be driven to move relative to the image sensor as well as an object to be captured, i.e., the lens can thus be driven to an in-focus position to capture the object clearly.

However, the lens barrel as well as the lens illustrated above has to be rotated relative to the image sensor or the object, in this case, if abrasion occurs between the lens barrel and the image sensor housing, it may easily lead the lens to a loss of concentricity with the image sensor, i.e., lead the lens to deviate from the optical axial direction, thereby reducing the quality of the image.

What is needed, therefore, is a lens module which overcomes the above-mentioned problems.

What is also needed is an image capture apparatus using such a lens module.

SUMMARY

In a preferred embodiment, an exemplary lens module includes at least one lens, a lens barrel, a motor, a barrel holder, a ring-shaped cam member and at least one elastic member. The lens barrel receives the at least one lens therein, the lens barrel has at least three protrusions provided thereon. The motor includes a stator and a rotator, the stator surrounds the rotator therein and is defined with coils thereon. The barrel holder has an inner space for receiving the lens barrel therein and an annular socket for receiving the rotator therein. The ring-shaped cam member is attached to the rotator, the cam member has at least three sloping portions each having a lower end and a higher end sloping toward the lower end, the at least three sloping portions are arranged to be adjacent to one another in an end to end fashion. The at least one elastic member is configured (i.e. structured and arranged) for applying a force on the lens barrel toward the cam member. Wherein the at least three protrusions abut against and on the respective at least three sloping portions, the cam member and the rotator are magnetically driven by the stator to be rotatable relative to the barrel holder between a first position where the at least three protrusions abut against and on the lower ends of the at least three sloping portions and a second position where the at least three protrusions abut against and on the higher ends thereof, thus the lens barrel and the at least one lens are movable relative to the cam member in the barrel holder.

In another preferred embodiment, an exemplary image capture apparatus includes at least one lens, a lens barrel, a motor, a barrel holder, a ring-shaped cam member, at least one elastic member and an image sensor. The lens barrel receives the at least one lens therein, the lens barrel has at least three protrusions provided thereon. The motor includes a stator and a rotator, the stator surrounds the rotator therein and is defined with coils thereon. The barrel holder has an inner space for receiving the lens barrel therein and an annular socket for receiving the rotator therein. The ring-shaped cam member is attached to the rotator, the cam member has at least three sloping portions each having a lower end and a higher end sloping toward the lower end, the at least three sloping portions are arranged to be adjacent to one another in an end to end fashion. The at least one elastic member is configured (i.e. structured and arranged) for applying a force on the lens barrel toward the cam member. The image sensor is configured for detecting light from the lens. Wherein the at least three protrusions abut against and on the respective at least three sloping portions, the cam member and the rotator are magnetically driven by the stator to be rotatable relative to the barrel holder between a first position where the at least three protrusions abut against and on the lower ends of the at least three sloping portions and a second position where the at least three protrusions abut against and on the higher ends thereof, thus the lens barrel and the at least one lens are movable relative to the cam member in the barrel holder.

Other advantages and novel features of the invention will become more apparent from the following detailed description when taken in conjunction with the accompanying drawings.

BRIEF DESCRIPTION OF THE DRAWINGS

Many aspects of the lens module and the image capture apparatus can be better understood with reference to the following drawings. The components in the drawing are not necessarily drawn to scale, the emphasis instead being placed upon clearly illustrating the principles of the present lens module and image capture apparatus. Moreover, in the drawings, like reference numerals designate corresponding parts throughout the several views.

DETAILED DESCRIPTION OF THE PREFERRED EMBODIMENTS

Embodiments of the present lens module and image capture apparatus will now be described in detail below and with reference to the drawings.

Figure 1:
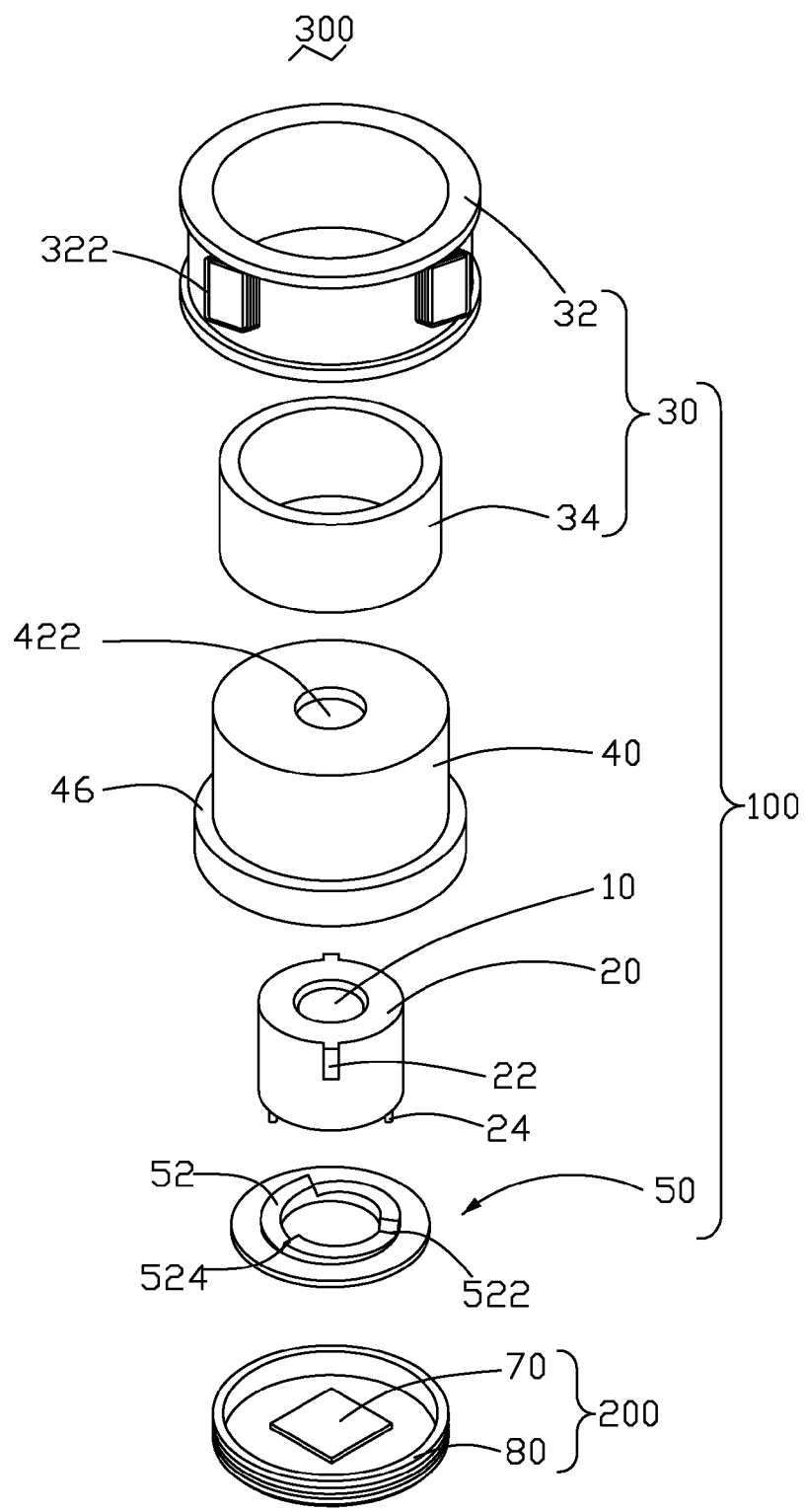
FIG. 1 is a disassembled perspective view of an image capture apparatus according to a first preferred embodiment.
Figure 2:
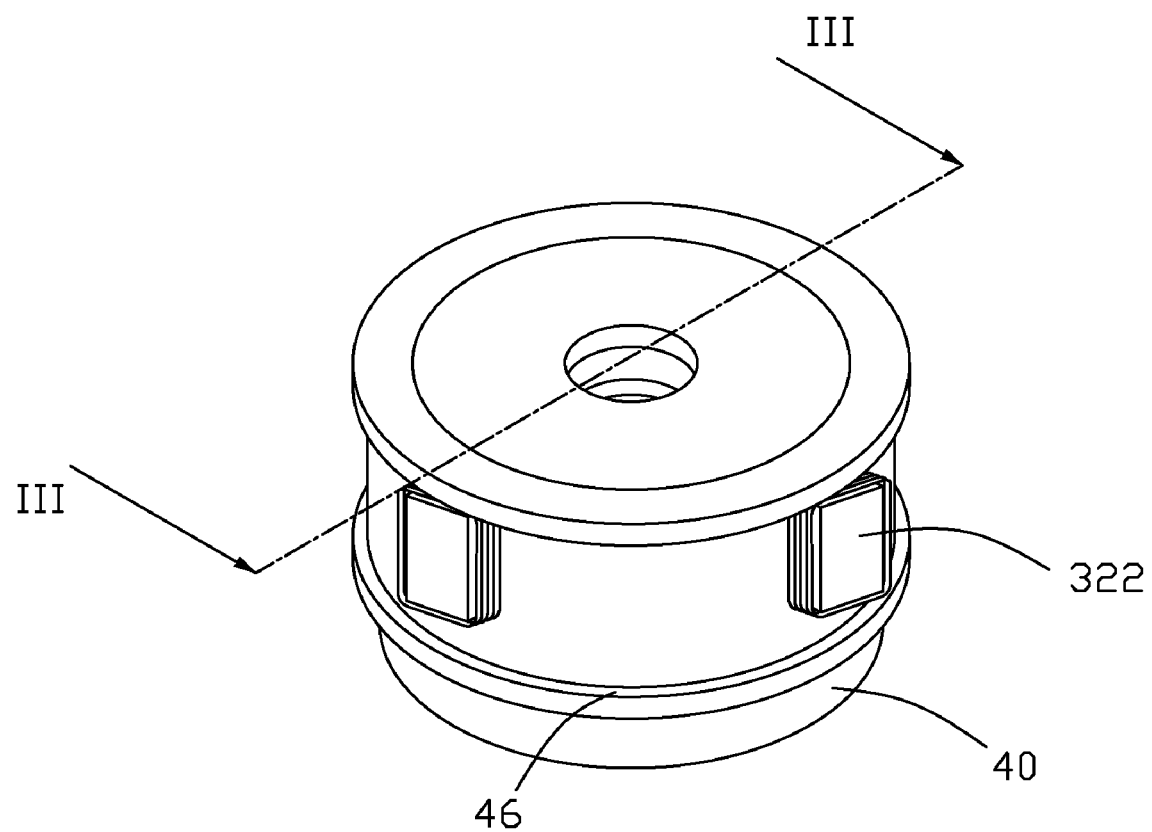
FIG. 2 is an assembled perspective view of the image capture apparatus shown in FIG. 1.
Figure 3:
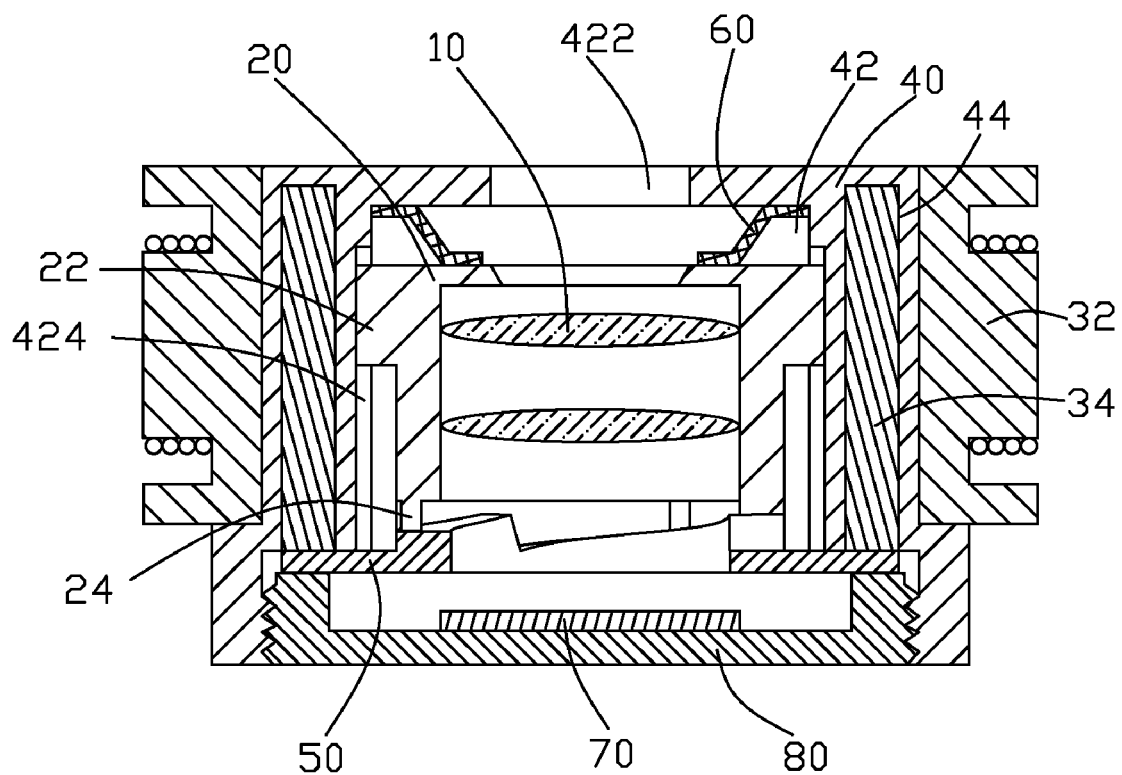
FIG. 3 is a cross-sectional view taken along line III-III of the image capture apparatus shown in FIG. 2.

Referring to FIGS. 1 to 3, an exemplary image capture apparatus 300 according to a first preferred embodiment includes a lens module 100 and an image sensor module 200. The lens module 100 includes at least one lens 10, a lens barrel 20, a motor 30, a barrel holder 40, a cam member 50 and two elastic members 60. The image sensor module 200 includes an image sensor 70 and an image sensor housing 80.

The at least one lens 10 can be made of plastic or glass and has a spherical or aspherical shape. The at least one lens 100 is configured for converging light from an object (not shown).

The lens barrel 20 is configured (i.e. structured and arranged) for receiving the lens 10 therein, the lens barrel 20 has at least two spaced guiding protrusions 22 provided on an outer wall thereof, and at least three spaced protrusions 24 provided on an end thereof.

The motor 30 includes a stator 32 and a rotator 34, the stator 32 surrounds the rotator 34 therein, and is defined with several groups of coils 322 thereon. When the coils 322 is electrified, an inductive magnetic field is introduced to the rotator 16 by the stator 14, and the rotator 16 can thus be driven to rotate.

The barrel holder 40 has an inner space 42 for receiving the lens barrel 20 therein, an annular socket 44 for receiving the rotator 34 therein, and a flange 46 for receiving the stator 32 thereon. The barrel holder 40 further has an end opening 422 for enabling light to enter into the lens 10, and at least two spaced guiding grooves 424 defined lengthwise in an inner wall of the inner space 42, the at least two guiding protrusions 22 are movably received lengthwise in their respective guiding grooves 424.

Figure 4:
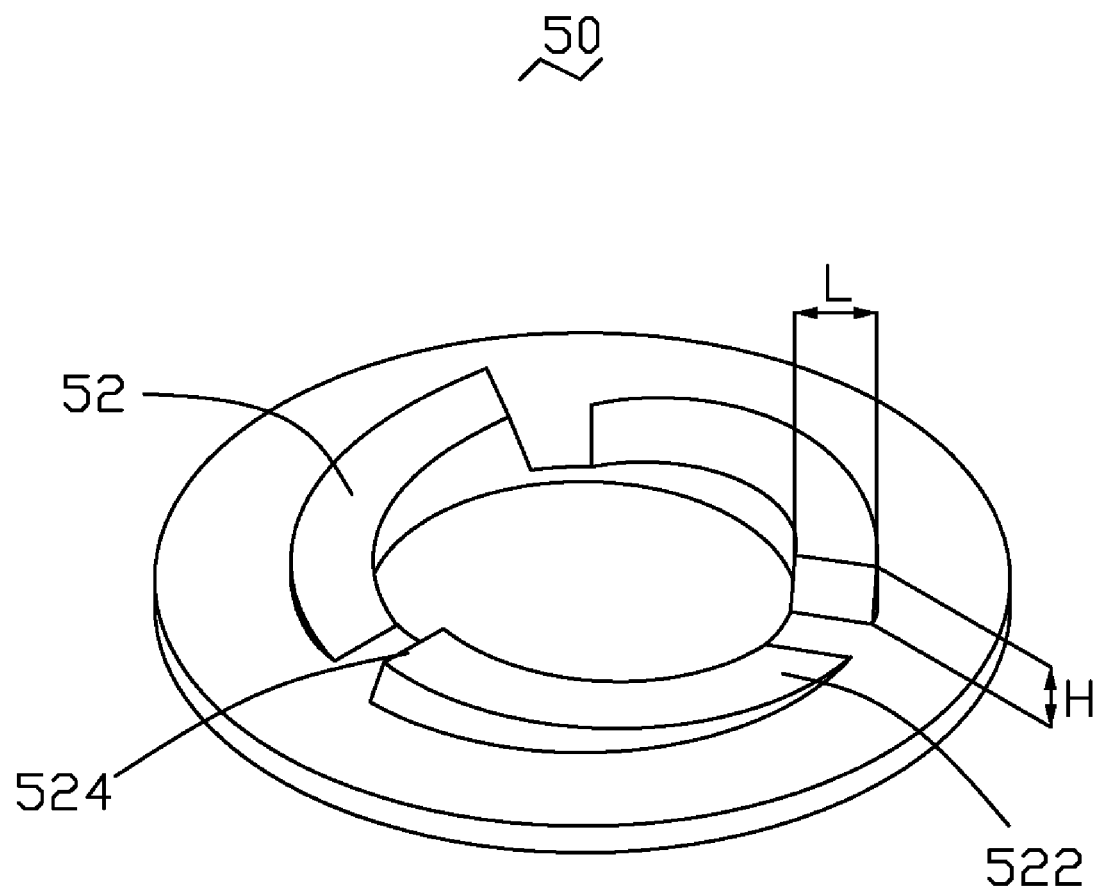
FIG. 4 is a schematic view of a second exemplary cam member shown in FIG. 1.

The cam member 50 is ring-shaped, and is attached to the rotator 34 so as to rotate with the rotator 34. The cam member 50 has at least three sloping portions 52 each having a lower end 522 and a higher end 524 sloping toward the lower end 522, the at least three sloping portions 52 are arranged to be adjacent to one another in an end to end fashion. The at least three sloping portions 52 can be connected to one another (see FIG. 1), or equidistantly spaced (see FIG. 4). A width L of each of the at least three sloping portions 52 is ⅓ that of the whole cam member 50, and height H of each of the at least three sloping portions 52 is dimensioned to be equal to a focus distance of the lens 10. Each of the at least three sloping portions 52 can have a surface with a constant curvature or variable curvature. The at least three protrusions 24 of the lens barrel 20 abut against and on the respective at least three sloping portions 52.

The two elastic members 60 are spaced, and each of the two elastic members 60 can be defined with one end integrally formed with the inner wall of the barrel holder 40 and another end abutting against and on the wall of the lens barrel 20. The two elastic members 60 are configured for applying a force on the lens barrel 20 toward the cam member 50, thus facilitating the at least three protrusions 24 keeping abutting against and on their respective at least three sloping portions 52 during the rotation of the cam member 50 and the rotator 34.

The cam member 50 and the rotator 34 in unison are magnetically driven by the stator 32 to be rotatable relative to the barrel holder 40 between a first position where the at least three protrusions 24 abut against and on the lower ends 522 of the at least three sloping portions 52 and a second position where the at least three protrusions 24 abut against and on the higher ends 524 thereof, thus the lens barrel 20 and the at least one lens 10 are movable relative to the cam member 50 in the barrel holder 40, and the lens 10 are driven to move to an in-focus position without necessarily rotating.

The image sensor 70 can be selected from Charge Coupled Device (CCD for short) and Complementary Metal-Oxide-Semiconductor Transistor (CMOS for short). The image sensor 70 is configured for detecting light from the lens 10 and then outputting an image electrical signal.

The image sensor housing 80 receives the image sensor 70 therein, the barrel holder 40 extends outward to engage with the image sensor housing 80, the cam member 50 is disposed on the image sensor housing 80. Preferably, a teflon coating can be coated on the image sensor housing 80 thereby reducing a rotational friction when the cam camber 50 rotates on the image sensor housing 80.

Alternatively, the guiding protrusions 22 illustrated above can be defined in an inner wall of the barrel holder 40, and the guiding grooves 424 illustrated above can be defined lengthwise in an outer wall of the lens barrel 20.

Alternatively, the lens barrel 20 can be driven to move along two guiding levers (not shown), each of the guiding levers can be integrally formed with the inner wall of the barrel holder 40 and lengthwise received in a guiding hole (not shown) in the wall of the lens barrel 20, thus the guiding protrusions 22 and the guiding grooves 424 illustrated above can be avoided.

Figure 5:
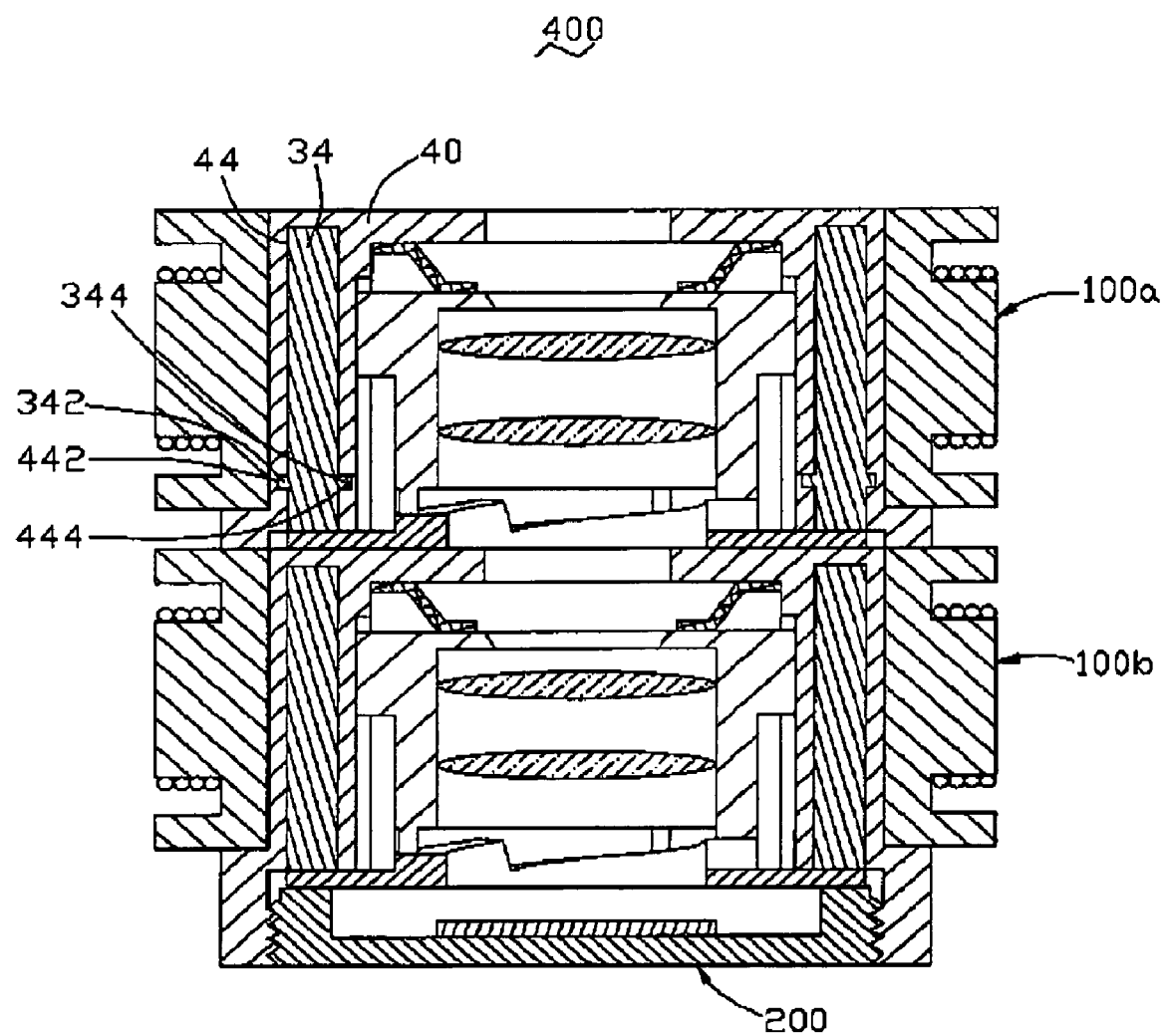
FIG. 5 is a schematic view of an image capture apparatus according to a second preferred embodiment.

Referring to FIG. 5, an exemplary image capture apparatus 400 according to a second preferred embodiment includes a first lens module 100a and second lens module 100b and an image sensor module 200.

The first lens module 100a is essentially similar to the lens module 100 illustrated in the first preferred embodiment, however, the first lens module 100a is disposed on the second lens module 100b, two protruding rings 342, 344 are respectively defined in an outer wall and inner wall of the rotator 34, and two receiving recesses 442, 444 configured for receiving the respective protruding rings 342, 344 are respectively defined in an inner wall of the annular socket 44 of the barrel holder 40. The two receiving recesses 442, 444 help the rotator 34 to rotate steadily.

The second lens module 100b is the same as the lens module 100 illustrated in the first preferred embodiment. The first and the second lens module 100a, 100b both can move relative to the image sensor module 200, so that the image capture apparatus 400 has an optical zooming function.

Figure 6:
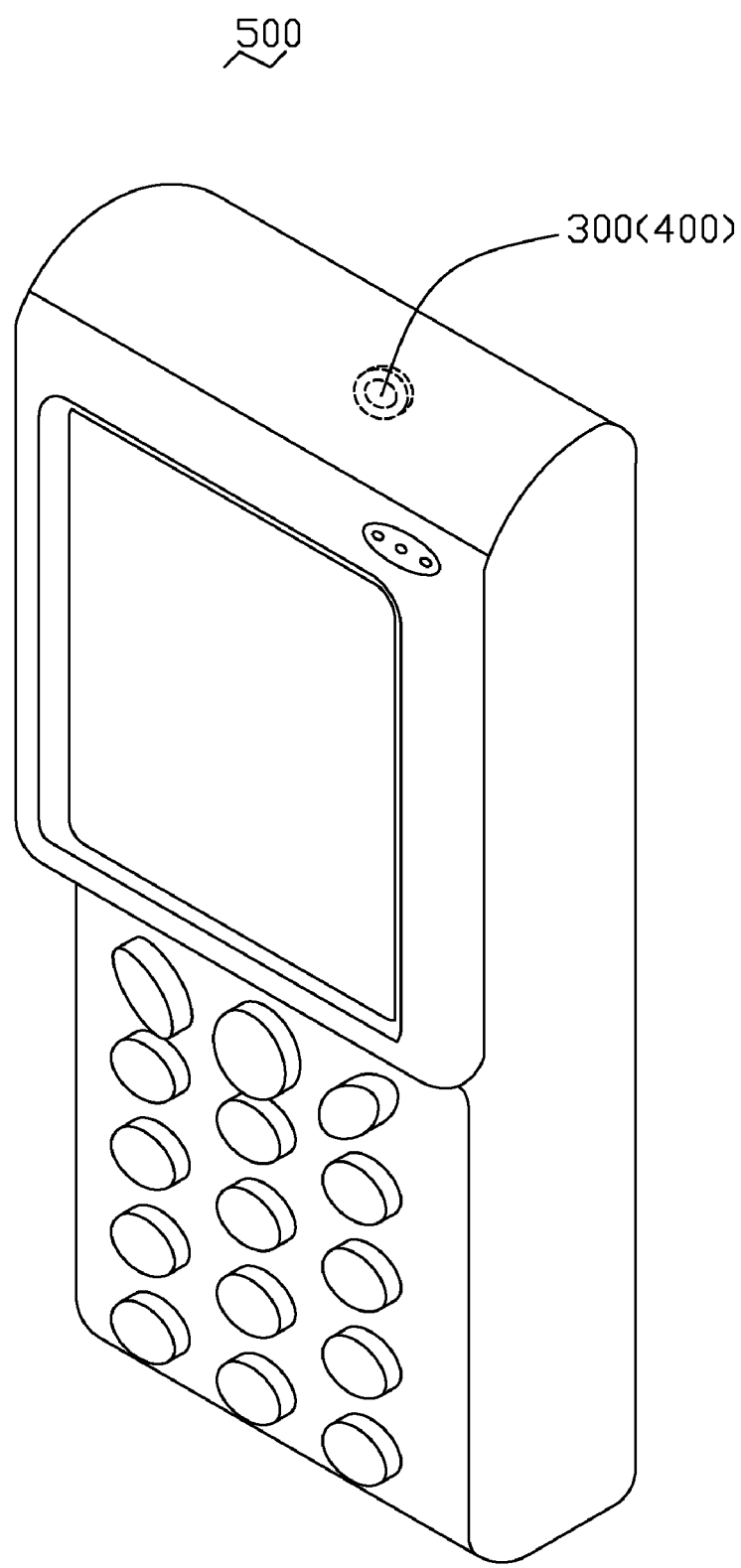
FIG. 6 is a schematic view of a portable electronic device using the image capture apparatus shown in FIG. 3 or FIG. 5.

FIG. 6 shows an exemplary portable electronic device 500 having the image capture apparatus 300 or 400 configured therein.

It is understood that the above-described embodiment are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A lens module, comprising:
   at least one lens;
   a lens barrel for receiving the at least one lens therein, the lens barrel having at least three protrusions provided thereon;
   a motor having a stator and a rotator, the stator surrounding the rotator therein and being defined with coils thereon;
   a barrel holder having an inner space for receiving the lens barrel therein and an annular socket for receiving the rotator therein, the rotator surrounding the lens barrel;
   a ring-shaped cam member attached to the rotator, the cam member having at least three sloping portions each having a lower end and a higher end sloping toward the lower end, the at least three sloping portions being arranged to be adjacent to one another in an end to end fashion; and
   at least one elastic member for applying a force on the lens barrel toward the cam member;
   wherein the at least three protrusions abut against and on the respective at least three sloping portions, the at least three protrusions and the rotator are arranged on a same side of the cam member, the cam member and the rotator are magnetically driven by the stator to be rotatable relative to the barrel holder between a first position where the at least three protrusions abut against and on the lower ends of the at least three sloping portions and a second position where the at least three protrusions abut against and on the higher ends thereof, thus the lens barrel and the at least one lens are movable relative to the cam member in the barrel holder.

2. The lens module as claimed in claim 1, wherein the barrel holder further has a flange on an outer wall thereof, the stator being mounted on the flange.

3. The lens module as claimed in claim 1, wherein the barrel bolder has at least two spaced guiding grooves defined lengthwise in an inner wall of the inner space, and the lens barrel has at least two spaced guiding protrusions provided on an outer wall thereof, the at least two guiding protrusions being movably received lengthwise in the respective guiding grooves.

4. The lens module as claimed in claim 1, wherein the at least three sloping portions are connected to one another.

5. The lens module as claimed in claim 1, wherein the at least three sloping portions are equidistantly spaced.

6. The lens module as claimed in claim 1, wherein a height of each of the at least three sloping portions is dimensioned to be equal to a focus distance of the lens.

7. The lens module as claimed in claim 1, wherein each of the at least three sloping portions has a surface with a constant curvature.

8. The lens module as claimed in claim 1, wherein a width of each of the at least three sloping portions is one third that of the entire cam member.

9. The lens module as claimed in claim 1, wherein two protruding rings are defined in an outer wall and an inner wall cite rotator, respectively, and two receiving recesses are defined in the annular socket for receiving the respective two protruding rings.

10. An image capture apparatus, comprising:
at least one lens;
a lens barrel for receiving the at least one lens therein, the lens barrel having at least three protrusions provided thereon;
a motor having a stator and a rotator, the stator surrounding the rotator therein and being defined with coils thereon;
a barrel holder having an inner space for receiving the lens barrel therein and an annular socket for receiving the rotator therein, the rotator surrounding the lens barrel;
a ring-shaped cam member attached to the rotator, the cam member having at least three sloping portions each having a lower end and a higher end sloping toward the tower end, the at least three sloping portions being arranged to be adjacent to one another in an end to end fashion;
at least one elastic member for applying a force on the lens barrel toward the cam member; and
an image sensor for detecting light from the lens;
wherein the at least three protrusions abut against and on the respective at least three sloping portions, the at least three protrusions and the rotator are arranged on a same side of the cam member, the cam member and the rotator are magnetically driven by the stator to be rotatable relative to the barrel holder between a first position where the at least three protrusions abut against and on the lower ends of the at least three sloping portions and a second position where the at least three protrusions abut against and on the higher ends thereof, thus the lens barrel and the at least one lens are movable relative to the cam member in the barrel holder.

11. The image capture apparatus as claimed in claim 10, wherein the barrel holder further has a flange on an outer wall thereof the stator being mounted on the flange.

12. The image capture apparatus as claimed in claim 10, wherein the barrel holder has at least two spaced guiding grooves defined lengthwise in an inner wall thereof, and the lens barrel has at least two spaced guiding protrusions provided on an outer wall thereof, the at least two guiding protrusions being movably received lengthwise in the respective guiding grooves.

13. The image capture apparatus as claimed in claim 10, wherein the at least three sloping portions are connected to one another.

14. The image capture apparatus as claimed in claim 10, wherein the at least three sloping portions are equidistantly spaced.

15. The image capture apparatus as claimed in claim 10, wherein a height of each of the at least three sloping portions is dimensioned to be equal to a focus distance of the lens.

16. The image capture apparatus as claimed in claim 10, wherein each of the at least three sloping portions has a surface with a constant curvature.

17. The image capture apparatus as claimed in claim 10, further comprising an image sensor housing for receiving the image sensor therein, the barrel holder being in threaded engagement with the image sensor housing, the cam member being defined on the image sensor housing.

18. The image capture apparatus as claimed in claim 10, wherein a width of each of the at least three sloping portions is one third that of the entire cam member.

19. The image capture apparatus as claimed in claim 10, wherein two protruding rings are defined in an outer wall and an inner wall of the rotator, respectively, and two receiving recesses are defined in the annular socket for receiving the respective two protruding rings.

20. An image capture apparatus, comprising:
at least one lens;
a lens barrel for receiving the at least one lens therein, the lens barrel having at least three protrusions provided thereon;
a motor having a stator and a rotator, the stator surrounding the rotator therein and being defined with coils thereon;
a barrel holder having an inner space for receiving the lens barrel therein and an annular socket for receiving the rotator therein;
a ring-shaped cam member attached to the rotator, the cam member having at least three sloping portions each having a lower end arid a higher end sloping toward the lower end, the at least three sloping portions being arranged to be adjacent to one another in an end to end fashion;
at least one elastic member for applying a force on the lens barrel toward the cam member; and
an image sensor far detecting light from the lens;
an image sensor housing for receiving the image sensor therein, the barrel holder being in threaded engagement with the image sensor housing, The cam member being defined on the image sensor housing;
wherein the at least three protrusions abut against and on the respective at least three sloping portions, the cam member and the rotator arc magnetically driven by the stator to be rotatable relative to the barrel holder between a first position where the at least three protrusions abut against and on the lower ends of the at least three sloping portions and a second position where the at least three protrusions abut against and on the higher ends of the at least three sloping portions, thus the lens barrel and the at least one lens are movable relative to the cam member in the barrel holder.

* * * * *